(12) United States Patent
Shen et al.

(10) Patent No.: US 12,549,406 B2
(45) Date of Patent: Feb. 10, 2026

(54) ELECTRIC VEHICLE MONITORING METHOD AND APPARATUS AND READABLE STORAGE MEDIUM

(71) Applicant: BYD COMPANY LIMITED, Shenzhen (CN)

(72) Inventors: Xiaofeng Shen, Shenzhen (CN); Ji Nie, Shenzhen (CN); Lvfen Chen, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 36 days.

(21) Appl. No.: 18/618,271

(22) Filed: Mar. 27, 2024

(65) Prior Publication Data

US 2024/0243944 A1 Jul. 18, 2024

Related U.S. Application Data

(63) Continuation of application No. PCT/CN2022/125899, filed on Oct. 18, 2022.

(30) Foreign Application Priority Data

Dec. 30, 2021 (CN) .......................... 202111667456.X

(51) Int. Cl.
*G05B 23/02* (2006.01)
*B60K 35/22* (2024.01)
(Continued)

(52) U.S. Cl.
CPC .... *H04L 12/40* (2013.01); *H04L 2012/40273* (2013.01)

(58) Field of Classification Search
CPC ........... H04L 12/40; H04L 2012/40273; H04L 41/0853; H04L 43/0817;
(Continued)

(56) References Cited

U.S. PATENT DOCUMENTS 6,744,379 B1 * 6/2004 Aker ...................... G08G 1/052
340/936
2011/0246891 A1 * 10/2011 Schubert ................. G06F 9/452
715/740
(Continued)

FOREIGN PATENT DOCUMENTS

CN 103200268 A 7/2013
CN 103568863 A 2/2014
(Continued)

OTHER PUBLICATIONS

The World Intellectual Property Organization (WIPO) International Search Report for PCT/CN2022/125899 Jan. 17, 2023 7 pages (Including English translation).

*Primary Examiner* — Moustafa M Meky
*Assistant Examiner* — Elizabeth Kassa
(74) *Attorney, Agent, or Firm* — Wenye Tan

(57) ABSTRACT

An electric vehicle monitoring method, apparatus, and a readable storage medium are provided. The method includes the followings. A first configuration file corresponding to a first electric vehicle is obtained. The first configuration file includes first function information, first CAN communication protocol information, and first style information that correspond to the first electric vehicle. The first function information, the first CAN communication protocol information, and the first style information are obtained according to the first configuration file. Configuration information that is of a target function and that is corresponding to the first function information is obtained. Display content of the target function in a set display interface is configured according to the first style information and the configuration information of the target function. Monitoring processing is performed on the first electric vehicle according to the (Continued)

display content and the first CAN communication protocol information.

18 Claims, 3 Drawing Sheets

(51) Int. Cl.
*B60K 35/29* (2024.01)
*B60L 3/12* (2006.01)
*H04L 12/40* (2006.01)
*H04L 41/0853* (2022.01)
*H04L 43/0817* (2022.01)

(58) Field of Classification Search
CPC ..... H04L 2012/40215; H04L 12/40032; H04L 67/12; H04L 67/303; H04L 43/04; H04L 43/50; B60L 3/0046; B60L 2240/545; B60L 2240/547; B60L 2240/549; B60L 2240/80; B60L 2250/10; B60L 2250/12; B60L 2250/16; B60L 3/12; B60L 58/10; G05B 23/02; B60K 2360/151; B60K 2360/171; B60K 2360/1876; B60K 35/22; B60K 35/29; G07C 5/008; G07C 5/0816; G07C 5/00; G07C 5/08; G07C 5/0841
USPC ...................................................... 709/230
See application file for complete search history.

(56) References Cited

U.S. PATENT DOCUMENTS

| | | | |
|---|---|---|---|
| 2013/0093851 A1* | 4/2013 | Yamamoto | G01S 15/931 348/46 |
| 2014/0277887 A1* | 9/2014 | Slattery | B60L 53/65 701/22 |
| 2016/0171799 A1* | 6/2016 | Bertness | B60L 3/12 701/22 |
| 2016/0306534 A1* | 10/2016 | Woo | G09G 5/373 |
| 2017/0140757 A1* | 5/2017 | Penilla | G06F 3/0488 |
| 2017/0369084 A1* | 12/2017 | Goda | G06F 9/44505 |
| 2018/0091930 A1* | 3/2018 | Jefferies | G07C 9/00571 |
| 2023/0303091 A1* | 9/2023 | You | B60L 53/65 |

FOREIGN PATENT DOCUMENTS

| | | | | |
|---|---|---|---|---|
| CN | 105022381 A | * | 11/2015 | ......... G05B 23/0213 |
| CN | 105843619 A | * | 8/2016 | ................ G06F 8/38 |
| CN | 205827200 U | | 12/2016 | |
| CN | 106373349 A | * | 2/2017 | ............. G08B 25/10 |
| CN | 207652462 U | | 7/2018 | |
| CN | 108803580 A | | 11/2018 | |
| CN | 108995613 A | | 12/2018 | |
| CN | 109800040 A | * | 5/2019 | |
| CN | 110019381 A | * | 7/2019 | ......... G05B 19/0423 |
| CN | 211148867 U | | 7/2020 | |
| CN | 111538628 A | | 8/2020 | |
| CN | 111835873 A | | 10/2020 | |
| CN | 112199094 A | * | 1/2021 | ............... G06F 8/41 |
| CN | 113168382 A | | 7/2021 | |
| WO | 2020148882 A1 | | 7/2020 | |
| WO | WO-2023124416 A1 | * | 7/2023 | ............. G05B 23/02 |

\* cited by examiner

ELECTRIC VEHICLE MONITORING METHOD AND APPARATUS AND READABLE STORAGE MEDIUM

CROSS-REFERENCE TO RELATED APPLICATIONS

This application is a continuation application of PCT application No. PCT/CN2022/125899, filed on Oct. 18, 2022, which claims priority to Chinese Patent Application No. 202111667456.X, filed on Dec. 30, 2021 and entitled "ELECTRIC VEHICLE MONITORING METHOD AND APPARATUS AND READABLE STORAGE MEDIUM". The entire content of all of the above-referenced applications is incorporated herein by reference.

FIELD

The present disclosure relates to the field of electric vehicle technologies, and more specifically, to an electric vehicle monitoring method and apparatus and a readable storage medium.

BACKGROUND

As a development trend of new energy vehicles, electric vehicles can replace existing vehicles using fuel materials, which is helpful to resolve the problem of vehicle fuel emission pollution. To promote sustainable development of electric vehicles, it is necessary to monitor the electric vehicles in phases of development, production, usage, and the like of the electric vehicles.

At present, corresponding monitoring programs may be designed according to specific battery technologies, corresponding monitoring needs, and the like.

However, due to continuous updating of the battery technologies, changing of the monitoring needs, and the like, it is necessary to redesign the corresponding monitoring programs repeatedly. As a result, the overall monitoring effect is not good.

SUMMARY

According to a first aspect of the present disclosure, an electric vehicle monitoring method is provided, which includes the following steps. A first configuration file corresponding to a first electric vehicle is obtained. The first configuration file includes first function information, first CAN communication protocol information, and first style information. The first function information, the first CAN communication protocol information, and the first style information are obtained according to the first configuration file. Configuration information that is of a target function and that is corresponding to the first function information is obtained. Display content of the target function in a set display interface is configured according to the first style information and the configuration information of the target function. Monitoring processing is performed on the first electric vehicle according to the display content and the first CAN communication protocol information.

According to a second aspect of the present disclosure, an electric vehicle monitoring apparatus is further provided, which includes the following modules. A first obtaining module is configured to obtain a first configuration file corresponding to a first electric vehicle. The first configuration file includes first function information, first CAN communication protocol information, and first style information. A second obtaining module is configured to obtain the first function information, the first CAN communication protocol information, and the first style information according to the first configuration file. A third obtaining module is configured to obtain configuration information that is of a target function and that is corresponding to the first function information. A first processing module is configured to configure display content of the target function in a set display interface according to the first style information and the configuration information of the target function. A second processing module is configured to perform monitoring processing on the first electric vehicle according to the display content and the first CAN communication protocol information.

According to a third aspect of the present disclosure, an electric vehicle monitoring apparatus is further provided, which includes a memory and a processor. The memory is configured to store a computer program. The processor is configured to execute the computer program to implement the method according to the first aspect of the present disclosure.

According to a fourth aspect of the present disclosure, a computer-readable storage medium is further provided. The computer-readable storage medium stores a computer program which, when executed by a processor, implements the method according to the first aspect of the present disclosure.

Other features and advantages of the embodiments of the present disclosure will become apparent from the following detailed description of exemplary embodiments of the present disclosure with reference to the drawings.

BRIEF DESCRIPTION OF THE DRAWINGS

Accompanying drawings are incorporated into and constitute a part of this specification, show certain embodiments of the present disclosure, and are used together with this specification to describe embodiments of the present disclosure.

DETAILED DESCRIPTION

Various embodiments of the present disclosure are now be described in detail with reference to the accompanying drawings. It is to be noted that unless otherwise specified, opposite arrangement, numerical expressions, and numerical values of components and steps described in the embodiments do not limit the scope of the present disclosure.

The following descriptions are merely illustrative, and in no way constitute any limitation on the present disclosure and application or use of the present disclosure.

In all examples shown and discussed herein, any specific value should be construed as merely examples and not as limitations. Therefore, other examples of embodiments may have different values.

It is to be noted that similar labels and letters represent similar items in the accompanying drawings below. Therefore, once an item is defined in one accompanying drawing, the item does not need to be further discussed in the subsequent accompanying drawings.

One of the objectives of embodiments in the present disclosure is to provide a new technical solution for electric vehicle monitoring.

One of beneficial effects of the embodiments in the present disclosure is as follows: A first configuration file corresponding to a first electric vehicle is obtained. The first configuration file includes first function information, first CAN (controller area network) communication protocol information, and first style information that correspond to the first electric vehicle. The first function information, the first CAN communication protocol information, and the first style information are obtained according to the first configuration file. Configuration information that is of a target function and that is corresponding to the first function information is obtained. Display content of the target function in a set display interface is configured according to the first style information and the configuration information of the target function. Monitoring processing is performed on the first electric vehicle according to the display content and the first CAN communication protocol information. It can be learned that a configuration file including function information, CAN communication protocol information, and style information that correspond to an electric vehicle to be monitored is imported, to cope with diversified models and changing monitoring needs. A corresponding functional monitoring interface can be configured in a targeted manner based on the configuration file in this embodiment, so that a user can realize monitoring processing on the electric vehicle to be monitored accordingly. This general reconfigurable monitoring manner is applicable to various electric vehicles and monitoring purposes under various monitoring needs, without repeatedly designing targeted monitoring programs, thereby improving an overall monitoring effect.

<Hardware Configuration>

Figure 1:
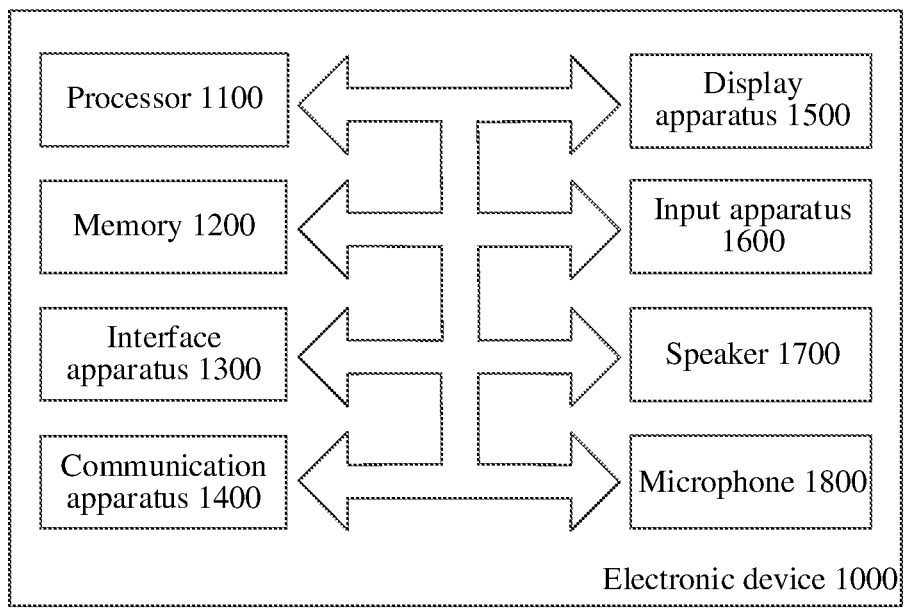
FIG. 1 is a schematic diagram of a composition structure of an electronic device capable of implementing an electric vehicle monitoring method according to an embodiment of the present disclosure.

FIG. 1 is a schematic structural diagram of an electronic device 1000 that may be used to implement the embodiments of the present disclosure.

The electronic device 1000 may be a smartphone, a portable computer, a desktop computer, a tablet computer, a server, or the like. This is not limited herein.

The electronic device 1000 may include but not be limited to a processor 1100, a memory 1200, an interface apparatus 1300, a communication apparatus 1400, a display apparatus 1500, an input apparatus 1600, a speaker 1700, a microphone 1800, and the like. The processor 1100 may be a central processing unit CPU, a graphics processing unit GPU, a microcontroller unit MCU, or the like, configured to execute a computer program. The computer program may be written using instruction sets such as x86, Arm, RISC, MIPS, SSE, and other architectures. The memory 1200 includes, for example, a read-only memory (ROM), a random access memory (RAM), a non-volatile memory such as a hard drive, and the like. The interface apparatus 1300 includes, for example, a USB interface, a serial interface, a parallel interface, and the like. For example, the communication apparatus 1400 can perform wired communication by using an optical fiber or a cable, or perform wireless communication, which may specifically include WiFi communication, Bluetooth communication, 2G/3G/4G/5G communication, and the like. The display apparatus 1500 is, for example, a liquid crystal display, a touchscreen, or the like. The input apparatus 1600 may include, for example, a touchscreen, a keyboard, a somatosensory input, or the like. The speaker 1700 is configured to output an audio signal. The microphone 1800 is configured to collect an audio signal.

In the embodiments of the present disclosure, the memory 1200 of the electronic device 1000 is configured to store a computer program. The computer program is used to control the processor 1100 to operate to implement a method according to the embodiments of the present disclosure. Persons skilled in the art may design the computer program according to the solution disclosed in the present disclosure. How the computer program controls the operation of the processor is well known in the art. Therefore, details are not described herein. An intelligent operating system (such as Windows, Linux, Android, or iOS) and application software may be installed in the electronic device 1000.

It is to be understood by persons skilled in the art that, although multiple apparatuses of the electronic device 1000 are shown in FIG. 1, the electronic device 1000 in the embodiments of the present disclosure may involve only some of these apparatuses, for example, involve only the processor 1100 and the memory 1200.

In the following, various embodiments and examples of the present disclosure are described with reference to the accompanying drawings.

Method Embodiments

Figure 2:
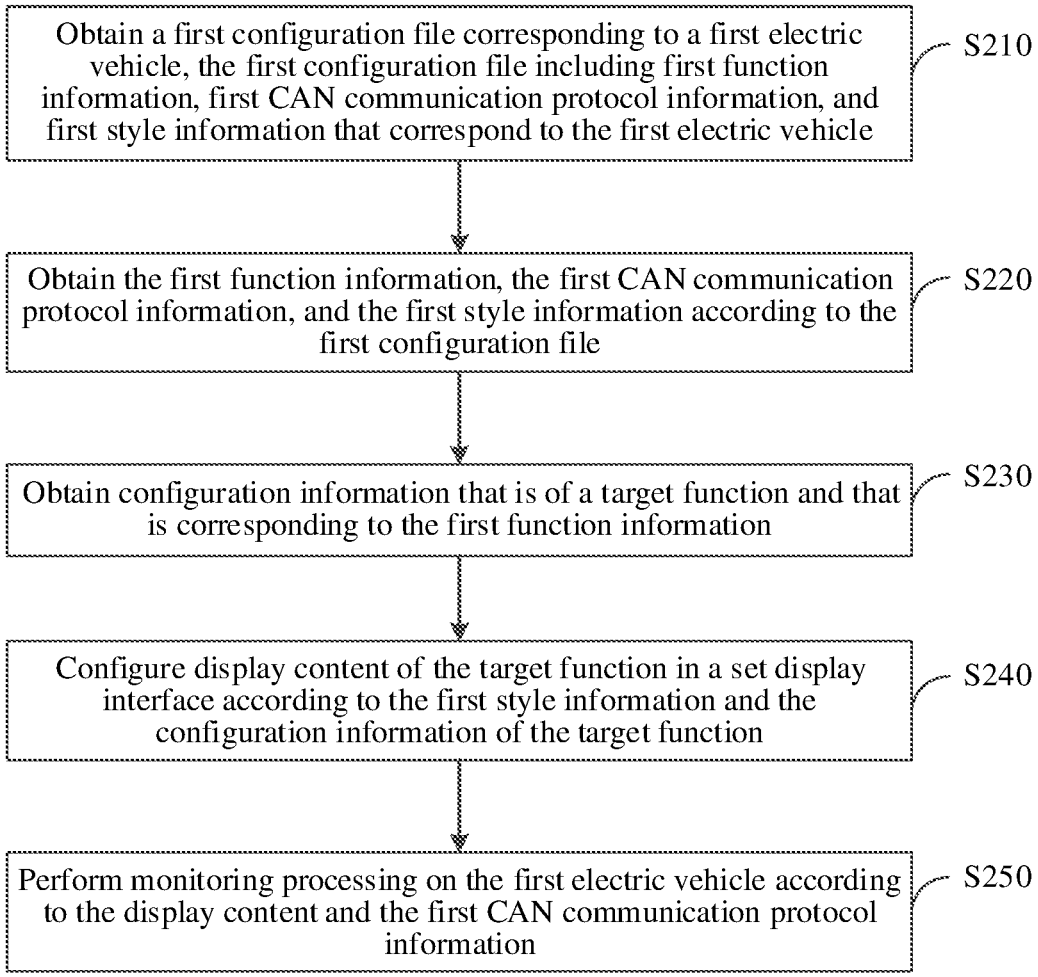
FIG. 2 is a schematic flowchart of an electric vehicle monitoring method according to an embodiment of the present disclosure.

FIG. 2 is a schematic flowchart of an electric vehicle monitoring method according to an embodiment. This embodiment is performed by, for example, the electronic device 1000 shown in FIG. 1.

Specifically, an electric vehicle monitoring apparatus performing the electric vehicle monitoring method may be arranged in an upper computer. A software program used to implement the electric vehicle monitoring method may be used as a general and reconfigurable electric vehicle monitoring platform and installed in the upper computer. The upper computer may be a personal computer or the like.

In this way, the upper computer may perform monitoring processing on a lower computer, i.e., an electric vehicle, through the electric vehicle monitoring platform, to achieve expected monitoring effects such as patching vulnerabilities and increasing functions. It can be learned that introduction of an electric vehicle monitoring function has played a huge role in promoting development of the electric vehicle, and is an essential tool for monitoring the electric vehicle.

Specifically, monitoring on the electric vehicle may be implemented based on communication of a controller area network (CAN) bus. In this way, in a feasible implementation, the upper computer may implement monitoring processing on the electric vehicle by connecting to a USB-CAN interface card.

In the feasible implementation, the CAN interface card connected to the upper computer may not be fixed. Therefore, when performing monitoring processing on the electric vehicle, the upper computer may determine a corresponding data sending and receiving manner according to a type of the connected CAN interface card, and implement monitoring processing on the electric vehicle based on the determined data sending and receiving manner.

A CAN bus protocol is a standard bus protocol for an automobile computer control system and an embedded industrial control local area network. An automobile CAN bus belongs to a C-class automobile bus network, the C-class network is used for a system with high speed, real-time and reliability requirements, and a speed is usually above 500 kbps.

In this way, data transmission between the upper computer and the lower computer may be performed through the CAN network according to a corresponding communication protocol procedure. Specifically, data exchange between the lower computer and the electric vehicle monitoring platform of the upper computer is implemented through a protocol service, and monitoring on the lower computer is finally completed. For example, real-time data monitoring, historical data playback, remote data upload, and other effects may be achieved based on the CAN device interface.

Based on the foregoing content, as shown in FIG. 2, the electric vehicle monitoring method in this embodiment may include the following steps S210 to S250.

Step S210. A first configuration file corresponding to a first electric vehicle is obtained. The first configuration file includes first function information, first CAN communication protocol information, and first style information that correspond to the first electric vehicle.

Specifically, the first electric vehicle may be any electric vehicle to be monitored.

Specifically, a developer may correspondingly develop each configuration file for a specific electric vehicle to achieve a specific monitoring function according to changes in model and monitoring function requirements, and the like. Correspondingly, the electric vehicle monitoring apparatus may obtain these configuration files and configure corresponding display content of an electric vehicle monitoring page accordingly, so that a user monitors the electric vehicle according to the display content.

Specifically, the first electric vehicle may correspond to multiple configuration files, and each configuration file in the multiple configuration files corresponds to a different function. For example, there may be a configuration file for displaying vehicle information, a configuration file for achieving a calibration purpose, a configuration file for achieving a simulation purpose, a configuration file for controlling an electric vehicle, and the like.

Feasibly, formats of configuration files corresponding to different functions may be different. For example, a configuration file corresponding to a function may be a DBC configuration file, while a configuration file corresponding to another function may be an extensible markup language (XML) configuration file. DBC is an abbreviation of database can and represents a database file of the CAN.

To implement display of a corresponding function in a set display interface according to a configuration file, and implement monitoring on the electric vehicle for the function, any configuration file may include function information, CAN communication protocol information, and style information. In this embodiment, the electric vehicle monitoring apparatus may automatically configure a corresponding algorithm with reference to the function information and the CAN communication protocol information in the configuration file, and then perform subsequent monitoring processing based on the algorithm. The electric vehicle monitoring apparatus may perform monitoring processing in an expected monitoring manner by configuring different CAN communication protocol information as required.

Feasibly, some algorithms may be configured directly by the developer in the upper computer, and other algorithms may be obtained with reference to an external link library, or may be obtained directly from the external link library.

Based on this, when the algorithm needs to be obtained with reference to the external link library, in one embodiment of the present disclosure, algorithm index information corresponding to the first CAN communication protocol information may be obtained from a second configuration file corresponding to a dynamic link library before monitoring processing is performed on the first electric vehicle. An algorithm corresponding to the first CAN communication protocol information is obtained from the dynamic link library according to the algorithm index information, and an algorithm for performing monitoring processing on the first electric vehicle is obtained according to the algorithm.

It can be learned that the developer may not only develop each first configuration file for a specific electric vehicle and a specific monitoring function, but also develop the second configuration file corresponding to the dynamic link library. The required algorithm may be accurately obtained from the unified dynamic link library by developing the second configuration file.

Specifically, the developer may develop the algorithm index information corresponding to the first CAN communication protocol information in the second configuration file. The required algorithm in the dynamic link library may be accurately obtained based on the accurate algorithm index information. When there are changes in the vehicle model, the monitoring function, and the like and then the used algorithm in the dynamic link library needs to be changed, the second configuration file only needs to be correspondingly adjusted, which is convenient and fast.

Step S220. The first function information, the first CAN communication protocol information, and the first style information are obtained according to the first configuration file.

In this step, the function information, the CAN communication protocol information, and the style information may be parsed from each obtained configuration file.

Specifically, the function information and the style information may be used to implement display of configuration content of the corresponding function in the set display interface, and the function information and the CAN communication protocol information may be used to implement monitoring on the electric vehicle for the corresponding function.

Feasibly, by setting the style information, a display style of the configuration content of the function in the set display interface may be limited, and a display style of a monitoring result in the set display interface may be limited.

Step S230. Configuration information that is of a target function and that is corresponding to the first function information is obtained.

In this step, preset configuration information of the corresponding function may be obtained based on the obtained function information. The preset configuration information may be preset by the developer. Thus, in a feasible implementation, the function information may include a function identifier.

Feasibly, the preset function configuration information may be used to limit configuration content and a configuration location, and the like of the corresponding function on a setting page.

Step S240. Display content of the target function in a set display interface is configured according to the first style information and the configuration information of the target function.

Based on the foregoing content, in this step, the electric vehicle monitoring apparatus may configure the display content of the target function in the set display interface according to the obtained style information and the obtained function configuration information. The user may implement on-demand monitoring on the first electric vehicle for the target function by viewing the display content.

Considering that monitoring processing on the first electric vehicle may be performed for multiple functions, configuration of each monitoring function of the first electric vehicle in the set display interface may be completed based on repeated execution of step S210 to step S240.

Step S250. Monitoring processing is performed on the first electric vehicle according to the display content and the first CAN communication protocol information.

In this step, the electric vehicle monitoring apparatus may implement monitoring processing on the corresponding electric vehicle according to the configured display content and the obtained CAN communication protocol information.

As mentioned above, the corresponding algorithm may be automatically configured according to the function information and the CAN communication protocol information, and then monitoring processing may be performed based on the algorithm and the display content.

It can be learned from the above that this embodiment provides the electric vehicle monitoring method. In the method, the first configuration file corresponding to the first electric vehicle is obtained. The first configuration file includes the first function information, the first CAN communication protocol information, and the first style information that correspond to the first electric vehicle. The first function information, the first CAN communication protocol information, and the first style information are obtained according to the first configuration file. The configuration information that is of the target function and that is corresponding to the first function information is obtained. The display content of the target function in the set display interface is configured according to the first style information and the configuration information of the target function. Monitoring processing is performed on the first electric vehicle according to the display content and the first CAN communication protocol information. It can be learned that a configuration file including function information, CAN communication protocol information, and style information that correspond to an electric vehicle to be monitored is imported, to cope with diversified models and changing monitoring needs. A corresponding functional monitoring interface can be configured in a targeted manner based on the configuration file in this embodiment, so that a user can realize monitoring processing on the electric vehicle to be monitored accordingly. This general reconfigurable monitoring manner is applicable to various electric vehicles and monitoring purposes under various monitoring needs, without repeatedly designing targeted monitoring programs, thereby improving an overall monitoring effect.

Specifically, the monitoring processing on the electric vehicle may include surveillance processing, calibration processing, simulation processing, and control processing, that is, to implement monitoring on the electric vehicle from different angles respectively.

Taking the surveillance processing as an example, the first CAN communication protocol information obtained from the corresponding first configuration file may correspondingly include CAN communication protocol information for achieving the surveillance purpose, and then an algorithm for achieving the surveillance purpose may be obtained accordingly.

Based on this, in an embodiment of the present disclosure, in the case of surveillance on the electric vehicle, when the display content includes first content for looking up electric vehicle information, step S250 in which monitoring processing is performed on the first electric vehicle according to the display content and the first CAN communication protocol information may include step S250a1 to step S250a3.

Step S250a1. A first algorithm is determined according to the first function information and CAN communication protocol information corresponding to the first content in the first CAN communication protocol information.

In this step, the algorithm for achieving the surveillance purpose is first determined according to a part for achieving the surveillance purpose in the first function information and the first CAN communication protocol information.

Step S250a2. Information reported by the first electric vehicle through a CAN network bus is processed according to the first algorithm, to obtain a first processing result.

To achieve the monitoring purpose, the electric vehicle may report status information of the electric vehicle in real time. For example, battery information of the electric vehicle may be usually reported by a battery management system (BMS) of the electric vehicle, so that the user views the status information in time. Correspondingly, the electric vehicle monitoring apparatus may process, according to the first algorithm, the information reported by the electric vehicle, to obtain the corresponding processing result.

Step S250a3. The first processing result is displayed in the set display interface according to the first content.

In this step, the electric vehicle monitoring apparatus may display the first processing result for the user to view with reference to the first content, so that the user learns of a real-time operating status of the electric vehicle in real time.

Feasibly, based on the monitoring method provided in this embodiment, the electric vehicle monitoring apparatus may monitor, through communication with the lower computer in real time, status information of an electric vehicle battery transmitted on a CAN network node, such as a battery voltage, charge and discharge currents, a battery module temperature, each cell voltage of the battery, and various alarm status information.

In an embodiment of the present disclosure, in the case of the calibration purpose on the electric vehicle, when the display content includes second content for achieving calibration, that monitoring processing is performed on the first electric vehicle according to the display content and the first CAN communication protocol information may include step S250b1 to step S250b3.

Step S250b1. In response to first input information of the outside for the second content, a second algorithm is determined according to the first function information and CAN communication protocol information corresponding to the second content in the first CAN communication protocol information.

To achieve the calibration purpose, for the second content displayed in the set display interface, the user may input information based on this as required, so that the information input by the user can be subsequently written into a specific module of the electric vehicle, such as the battery management system of the electric vehicle, to achieve the calibration purpose.

In this step, the algorithm for achieving the calibration purpose is determined according to a part for achieving the calibration purpose in the first function information and the first CAN communication protocol information.

Step S250b2. A calibration instruction corresponding to the first input information is obtained according to the second algorithm.

In this step, the corresponding calibration instruction may be generated according to the determined second algorithm and the information input by the user, so that the specific module of the electric vehicle can write, by executing the calibration instruction, the information input by the user.

Step S250b3. A battery management system in the first electric vehicle is controlled to execute the calibration instruction, to write the first input information into the battery management system.

In this step, the specific module, i.e., the battery management system may execute the calibration instruction to write the information input by the user, to implement calibration control over the electric vehicle.

It can be learned from the above that the user may perform calibration processing on the battery management system in the electric vehicle as required, and an operation is simple.

In an embodiment of the present disclosure, in the case of the simulation control purpose on the electric vehicle, when the display content includes third content for achieving simulation, that monitoring processing is performed on the first electric vehicle according to the display content and the first CAN communication protocol information may include step S250c1 and step S250c2.

Step S250c1. In response to second input information of the outside for the third content, a third algorithm is determined according to the first function information and CAN communication protocol information corresponding to the third content in the first CAN communication protocol information.

To achieve a purpose of simulation of sending information from another module of the electric vehicle to the specific module of the electric vehicle (such as the battery management system), the user may input information as required according to the third content displayed in the set display interface, so that the information input by the user can be subsequently transmitted to the specific module of the electric vehicle in the name of the another module, to achieve the simulation purpose.

Feasibly, the another module may be any one of a microcontroller unit (MCU), a vehicle control unit (VCU), an electronic control unit (ECU), a baseboard management controller (BMC), and a total distribution system (TDS) in the electric vehicle. The specific module may be the battery management system in the electric vehicle.

Specifically, others module in the electric vehicle and the specific module maintain a communication connection to the upper computer through the CAN network bus.

In this step, the algorithm for achieving the simulation purpose is determined according to a part for achieving the simulation purpose in the first function information and the first CAN communication protocol information.

Step S250c2. The second input information is sent to the battery management system in the first electric vehicle through the CAN network bus according to the third algorithm by using a role of a setting module. The setting module includes any one of a microcontroller unit, a vehicle control unit, an electronic control unit, a baseboard management controller, and a total distribution system of the first electric vehicle.

In this step, the information input by the user is sent to the battery management system in the electric vehicle based on the determined third algorithm by using the role of the setting module, to perform simulation control over the battery management system.

It can be learned from the above that the user may perform simulation control on the battery management system in the electric vehicle as required, and an operation is simple.

Specifically, in the case of real-time monitoring on the operating status of the electric vehicle, if the user finds that the electric vehicle is operating abnormally, a corresponding control instruction may be further delivered. For example, the user views a real-time temperature change of the battery of the electric vehicle, and if there is an abnormal temperature change, a corresponding temperature control instruction may be delivered.

Based on this, in an embodiment of the present disclosure, in the case of control on the electric vehicle, when the display content includes fourth content for controlling an electric vehicle, step S250 in which monitoring processing is performed on the first electric vehicle according to the display content and the first CAN communication protocol information may include steps S250d1, S250d2, and S250c3.

Step S250d1. In response to a first operation of the outside for the fourth content, a fourth algorithm is determined according to the first function information and CAN communication protocol information corresponding to the fourth content in the first CAN communication protocol information.

To achieve the control purpose, the user may input information as required according to the fourth content displayed in the set display interface, so that correspondingly control over the electric vehicle can be subsequently performed according to the information input by the user.

In this step, the algorithm for achieving the control purpose is determined according to a part for achieving the control purpose in the first function information and the first CAN communication protocol information.

Step S250d2. A control instruction corresponding to the first operation is obtained according to the fourth algorithm.

In this step, after viewing the fourth content, the user may perform an operation as required, to achieve the corresponding control purpose.

In this step, the electric vehicle monitoring apparatus may generate the corresponding control instruction according to the fourth algorithm with reference to the specific operation performed by the user. For example, the control instruction herein may be an instruction used to control the temperature of the battery.

Step S250c3. The battery management system in the first electric vehicle is controlled to execute the control instruction.

In this step, the electric vehicle monitoring apparatus may deliver the generated control instruction to the electric vehicle, so that the battery management system in the electric vehicle executes the control instruction, to achieve the control purpose on the electric vehicle. Specifically, the control instruction may be converted into a packet signal and sent to the CAN network bus through a CAN device.

It can be learned from the above that based on the monitoring method provided in this embodiment, the user can be supported to monitor the operating status of the electric vehicle in real time, calibration on the battery management system in the electric vehicle can also be achieved, the information may be further sent to the battery management system in the electric vehicle instead of the another module in the electric vehicle, and the control instruction may be sent to the battery management system. Specifically, basic control instructions of the whole vehicle can be debugged under conditions of bench tests and parking, and there may be performance of sending and responding the control instructions of the whole vehicle.

It can be learned that in this embodiment, based on editing of the developer for the CAN configuration file and the dynamic link library configuration file, reconstruction of a monitoring software interface, a function, an algorithm, and other aspects can be realized.

Based on the electric vehicle monitoring method provided in this embodiment, the developer may reconstruct interface information display and a signal parsing function by customizing and editing the CAN communication protocol configuration file of the electric vehicle; and may customize and edit the corresponding configuration file by using the dynamic link library technology, to achieve on-demand modification of the algorithm, so as to flexibly cope with constant changes in the model and monitoring needs, and the like and resolve the problem that there are different degrees of repetitive work in the development of conventional monitoring software, which causes a lot of manpower, material resources and financial waste.

Specifically, the user may at least input control operations on demand by triggering different controls. Based on this, in an embodiment of the present disclosure, the fourth content includes at least one first control, at least one second control, and an information input box corresponding to each first control.

Specifically, the second content may include at least two types of controls. For one type of control, the user triggers the control to deliver a corresponding control instruction, such as a control for reading a temperature of each cell. For another type of control, the user needs to input corresponding control data to deliver a corresponding control instruction, such as a control for the user to control a temperature of each cell.

Correspondingly, before the control instruction corresponding to the first operation is obtained, the method may further include step A1 to step A3.

Step A1. When the first operation includes an operation of inputting control information in any information input box, the inputted control information and configuration content corresponding to the first control in the configuration information are obtained. Step A3 is performed.

Specifically, the target function may include a function of monitoring the battery temperature of the electric vehicle. For the corresponding control temperature control, the control information input by the user may be a specific temperature control value. Different cells may have corresponding control temperature control. If the user needs to control a temperature of a cell, the user may input a required temperature control value in an information input box of the control temperature control corresponding to the cell.

In addition, after the user inputs the temperature control value, the electric vehicle monitoring apparatus may also obtain configuration content of the corresponding control temperature control in the configuration information of the target function, to subsequently generate a corresponding temperature control instruction accordingly.

Step A2. When the first operation includes an operation of triggering any second control, configuration content corresponding to the second control in the configuration information is obtained. Step A3 is performed.

In this step, the user may trigger any second control as required. For example, the user needs to know a current temperature of a cell, and then the user may trigger a corresponding second control.

In addition, after the user triggers any second control, the electric vehicle monitoring apparatus may also obtain configuration content corresponding to the triggered control in the configuration information of the target function, to subsequently generate a corresponding temperature reading instruction accordingly.

Step A3. The step of obtaining a control instruction corresponding to the first operation is performed according to the obtained control information and the obtained configuration content.

Specifically, the first operation input by the user may include at least one control action, such as triggering a control for reading a temperature of a cell and inputting a value for controlling a temperature of another cell. In this step, the electric vehicle monitoring apparatus may generate the corresponding control instruction according to the obtained control information and the obtained configuration content, to meet on-demand control of the user for the electric vehicle.

After the electric vehicle monitoring apparatus controls the electric vehicle, the electric vehicle may further feedback a control result. For example, when battery temperature control is performed, the electric vehicle may feedback a corresponding temperature control result. Correspondingly, the electric vehicle monitoring apparatus may display the control result.

Based on this, in an embodiment of the present disclosure, after step S250c3 in which the battery management system in the first electric vehicle is controlled to execute the control instruction, the method may further include step S250c4 and step S250c5.

Step S250c4. A second processing result of performing control processing on the battery management system in the first electric vehicle is obtained.

Specifically, the electric vehicle monitoring apparatus may deliver a control instruction to the electric vehicle, and the battery management system in the electric vehicle may correspondingly execute the control instruction and generate a corresponding processing result. To facilitate the user to view a control effect, the battery management system in the electric vehicle then reports the processing result to the electric vehicle monitoring apparatus.

Step S250c5. The second processing result is displayed in the set display interface according to the first style information.

In this step, the electric vehicle monitoring apparatus limits a display style of the processing result on the set display interface according to the style information obtained in advance, so that the user views the processing result with an expected display style.

It can be learned from the above that this embodiment can implement monitoring processing on the electric vehicle, and the monitoring processing is applicable not only to the development phase, but also to the basic monitoring phase.

Based on this, the electric vehicle monitoring apparatus in this embodiment may include a basic monitoring module, a development module, and a test module. The developer may develop the first configuration file based on the development module, and a worker may perform monitoring processing on the electric vehicle based on the basic monitoring module. In the developer mode, a monitoring test may further be performed based on the test module. If a test result meets an expectation, an ordinary monitoring mode may be entered. When monitoring processing is performed in the ordinary monitoring mode, no test needs to be performed.

Specifically, the required functions may be opened for different users based on an authorization technology. For example, in the developer mode, the relevant developer may have authorization for the basic monitoring module, the development module, the test module, an external development configuration folder, and use each module based on the authorization. In the ordinary mode, the relevant worker may have the authorization for the basic monitoring module and use the module based on the authorization, but no longer has the authorization for the development module, the test module, and the external development configuration folder. The developer may store development content into the external development configuration folder.

This embodiment is combined with the authorization technology and opens the corresponding functions to different user groups, to ensure security and confidentiality of software to the greatest extent. Thus, this embodiment not only facilitates the development and testing of electric vehicle developers, simplifies the monitoring operation, and effectively prevents occurrence of wrong monitoring, but also plays an important role in monitoring and maintenance of a system in the future.

Considering that the worker responsible for the monitoring operation does not need to know specific content of monitoring processing, to facilitate accurate execution of the monitoring processing, the function information, the CAN communication protocol information, and the style information may be set in an integrated first configuration file. In this way, each first configuration file only needs to be imported to achieve the corresponding electric vehicle monitoring purpose based on the electric vehicle monitoring apparatus.

Specifically, when there are new vehicle models, changes in function requirements of original vehicle models, changes in the monitoring needs, and the like, the developer may develop and design a corresponding first configuration file through the development module.

To facilitate execution of monitoring processing in different phases, various first configuration files in different phases may be stored in different memories. Specifically, in the developer mode, the first configuration file may be stored in a local memory such as a set external folder, and in the ordinary mode, the first configuration file may be stored in a remote server.

Based on this, in an embodiment of the present disclosure, that the first configuration file corresponding to the first electric vehicle is obtained may include step B1 or step B2.

Step B1. When a current monitoring mode corresponds to a developer mode, the first configuration file stored in a local memory is obtained.

Specifically, in the developer mode, each first configuration file may be obtained from the local memory, such as the set external folder, and then monitoring processing on the electric vehicle in the developer mode is performed accordingly.

Based on this, in an embodiment of the present disclosure, before the first configuration file stored in the local memory is obtained, the method may further include: When the current monitoring mode corresponds to the developer mode, the first configuration file is obtained in response to an operation for editing a configuration file. The first configuration file is stored into the local memory.

Specifically, in the developer mode, the developer may set the corresponding first configuration file according to the current monitoring need, and the set first configuration file is stored in the local memory, so that when monitoring processing is performed in the developer mode, each set first configuration file may be quickly obtained from the local memory, to implement monitoring processing in the developer mode.

If a processing result of the monitoring processing does not meet an expectation, the developer may modify a corresponding configuration file stored locally. It can be learned that this implementation can facilitate the developer to carry out development debugging work smoothly.

In addition, when monitoring work in the developer mode is successfully completed, so that monitoring work in the ordinary mode can be carried out, that is, after debugging of each of the first configuration files developed is completed, these configuration files may be uploaded to, such as, a repository in the remote server, and development and design of a new vehicle model monitoring platform can be completed. Based on this, electric vehicle monitoring work can be carried out in the ordinary mode.

Step B2. When the current monitoring mode does not correspond to the developer mode, the first configuration file stored in the remote server is obtained.

Specifically, in the ordinary mode, the first configuration file may be downloaded from the remote server, and then monitoring processing on the electric vehicle in the ordinary mode is performed accordingly. In this way, a unified expected monitoring effect can be achieved no matter where the user logs in to a monitoring system. Because the interface layout is modular with a single style, it is easy for the user to accurately perform the monitoring operation.

As mentioned above, the test can be carried out when monitoring processing in the developer mode, and monitoring processing in the ordinary mode can be performed after the test is passed.

Based on this, in an embodiment of the present disclosure, that monitoring processing is performed on the first electric vehicle may include: When the current monitoring mode corresponds to the developer mode, monitoring processing is performed on the first electric vehicle.

Specifically, the monitoring test in the developer mode can be carried out according to the test module of the electric vehicle monitoring apparatus. The test module may test feasibility of the developed first configuration file according to the processing result of monitoring processing on the electric vehicle.

Correspondingly, when the current monitoring mode corresponds to the developer mode, after monitoring processing is performed on the first electric vehicle, the method may further include step C1 to step C3.

Step C1. A third processing result of performing monitoring processing on the first electric vehicle is obtained.

Specifically, when monitoring processing is performed in the developer mode, a corresponding processing result may be obtained. The processing result may be compared with an expected processing result, to determine whether the monitoring procedure is performed as expected and whether a set configuration file is feasible.

Step C2. Whether the third processing result is consistent with a setting processing result corresponding to the first configuration file is determined.

In this step, consistency between the actual monitoring result and the expected monitoring result may be determined. If the configuration information developed by the developer is correct, a consistent result may usually be obtained; otherwise, the developer may adjust the configuration information and another operation as required.

Step C3. When the third processing result is consistent with the setting processing result, the first configuration file stored in the local memory is stored into the remote server.

In this step, after the consistent result is obtained, the information developed by the developer can be stored in the remote server, so that the corresponding information can be obtained from the remote server when monitoring processing is performed in the ordinary mode.

In this embodiment, the software function can be updated and reconstructed at any time through the remote server, and all user groups share latest resources of the server and perform update in a timely manner.

Different from the developer mode, no test is required when monitoring processing is performed in the ordinary mode. In this way, in the ordinary mode, as described in step S250, monitoring processing only needs to be performed directly according to the display content and the first CAN communication protocol information.

It can be learned from the above that the electric vehicle monitoring method provided in this embodiment may have at least the following characteristics:

(1) Applicable to Various Vehicle Models.

For an existing targeted monitoring platform, a vehicle model corresponds to at least one monitoring platform. As a result, development and design work is cumbersome, a lot of repetitive work needs to be carried out, development costs are high, a development cycle is long, and it is not conducive to effective application of resources.

This embodiment provides a general and reconfigurable electric vehicle monitoring platform that can be used for almost any vehicle model. In this way, repeated development work of the electric vehicle monitoring platform can no longer be required, which undoubtedly reduces processes and various costs required to implement monitoring processing on the electric vehicle.

(2) Flexible Monitoring Procedure that May be Further Extended.

For the existing targeted monitoring platform, the monitoring procedure and parameter information are solidified, so that during the whole project process, when the monitoring procedure information or parameter information needs to be changed due to the change in the entire system deployment or the customer demand, software source code needs to be modified and re-released. After many times of debugging, a response time period is long in coordination with the lower computer or other parts of the system test, and it is difficult to adapt to new changes.

The general and reconfigurable electric vehicle monitoring platform provided in this embodiment has characteristics of customization, which can customize user interface content, a user interface display style, and the like according to the monitoring needs, to cope with real-time changing monitoring needs. Based on the existing framework, the developer may only edit the configuration file without modifying the source code to achieve the secondary extension effect.

(3) Low Complexity of Software Monitoring Operations.

For the existing targeted monitoring platform, when different vehicle models are monitored, it is necessary to switch between different monitoring platforms and for the user to input monitoring information, and the operation is more complicated.

The general and reconfigurable electric vehicle monitoring platform provided in this embodiment can complete one-click monitoring page configuration by importing only various set first configuration file during the monitoring operation performed using the ordinary monitoring module. Then the user can achieve the purpose of monitoring the electric vehicle by performing a simple operation on the content displayed on the monitoring page as required.

(4) Coverage of a Wide Range of Functions.

For the existing targeted monitoring platform, due to omission of a project plan or a user preliminary plan and other factors, as well as the absence of some auxiliary analysis and testing functions, it is not conducive to more efficient project testing of the system.

The general and reconfigurable electric vehicle monitoring platform provided in this embodiment covers a wide range of functions and integrates monitoring, testing, and development functions to make it have good human-machine interaction. Especially when the development engineer of the lower computer uses the monitoring platform, the development engineer can easily and quickly use the monitoring platform to flexibly configure the procedure to complete the development work of the lower computer.

(5) Easy to Develop.

The general and reconfigurable electric vehicle monitoring platform provided in this embodiment provides maximum convenience to the developer of the lower computer for personalized configuration and reduces the development work of the monitoring platform.

Specifically, the developer only needs to view the configuration file to learn of details of the function design, which is clear and intuitive. The monitoring platform has good versatility and portability, reduces pressure on technical infrastructure and development tools, and focuses attention on the implementation of functional configuration. The configuration file editor no longer needs to deeply understand the underlying technology, and only needs to reuse, according to a service need, the previously developed configuration file to extend, supplement, improve, and perform other operations, and functional reconstruction of the software can be implemented. Therefore, the project can be configured without the development programmer and only configured with a person who understands the vehicle protocol.

For the existing targeted monitoring platform, the monitoring software code design is complicated and the readability is low. When a new project is imported, at least one software engineer should be configured for development, design and coding work. The developer needs to develop the project from scratch. The development process from platform design, coding implementation to debugging and release is time-consuming and laborious.

(6) Reduce a User Operation Level and Convenient to Manage.

For the existing targeted monitoring platform, persons skilled in the art need to pay attention to accuracy of the monitoring operation and accuracy of the monitoring platform on the station, as well as various monitoring platforms that need to be managed. A monitoring operation error includes inaccurate input of monitoring information during operation. An error of the monitoring platform is due to an increase in difficulty of monitoring platform management caused by monitoring needs of different vehicle models. The monitoring needs of the different vehicle models require use of different monitoring platforms, and monitoring of a same vehicle model in various phases also requires different versions of platforms, which leads to an increase in the difficulty of monitoring platform management, and errors in the use for various use departments of the original equipment manufacturer are also increase.

The general and reconfigurable electric vehicle monitoring platform provided in this embodiment is widely adapted to vehicle models, has a simple software operation and a single version, and greatly reduces the requirement on the user operation level. When the general and reconfigurable electric vehicle monitoring platform is used, a remote server can be connected to update latest and most complete information to the local, so that complicated version management work of the electric vehicle monitoring platform can be avoided. In addition, the software version is single, only the configuration file needs to be managed, and it is convenient to manage.

(7) Good User Experience.

A design scheme of the general and reconfigurable electric vehicle monitoring platform provided in this embodiment is based on a user-centered design principle and considers user experience, that is, response time of the system, an error information processing manner, a user command manner, a user interface language, and other aspects. The platform has strong customization and scalability, to greatly improve flexibility of development, debugging, troubleshooting, maintenance, demand changes, and other conditions, and effectively meet the needs of the user. Based on the general and reconfigurable electric vehicle monitoring platform, work efficiency is improved, and more manpower and material resources are saved.

(8) Secure and Reliable.

The general and reconfigurable electric vehicle monitoring platform in this embodiment can involve the basic monitoring module, the development module, and the test module, and integrate these modules into one. This embodiment is combined with the authorization technology and opens the corresponding functions to different user groups, to ensure security and confidentiality of software to the greatest extent. Thus, this embodiment not only facilitates the development and testing of automobile electronic developers, simplifies the monitoring operation, and effectively prevents occurrence of wrong monitoring, but also plays an important role in monitoring and maintenance of a system in the future.

(9) In Line with the Market Demand.

This embodiment provides a general and integrated electric vehicle monitoring platform that adapts to the development of the automotive diagnostic technology. The platform conforms to the development of the automotive diagnostic technology and caters to the development trend of the market, and has far-reaching and important significance and value for reliability, accuracy and stability of the automotive electric vehicle monitoring platform.

The general and reconfigurable electric vehicle monitoring platform provided in this embodiment can cope with constantly updated electric vehicle battery technologies and demand designs, and make full use of the relevant functions of the monitoring platform to improve development efficiency of the battery monitoring program and optimize a battery monitoring effect, so as to promote sustainable development of new energy electric vehicles. In this way, the monitoring platform can make automobile production enterprises have access to production of new energy vehicles, has guiding significance for management and maintenance of vehicles, and brings broader development prospects for the automobile industry.

(10) Facilitate Product Development.

This embodiment provides the general and reconfigurable electric vehicle monitoring platform with high flexibility, security, and reliability. The original equipment manufacturer can use the general and reconfigurable electric vehicle monitoring platform to rapidly expand a new set of monitoring procedure specifications, which can apply the platform on different vehicle models and different controllers, to avoid the situation of repeated development from scratch between the original equipment manufacturer and major customers. This reduces the difficulty of product development, the development cycle, the development and management costs, improves the efficiency of product development, and also improve quality and stability of the product.

Examples

Figure 3:
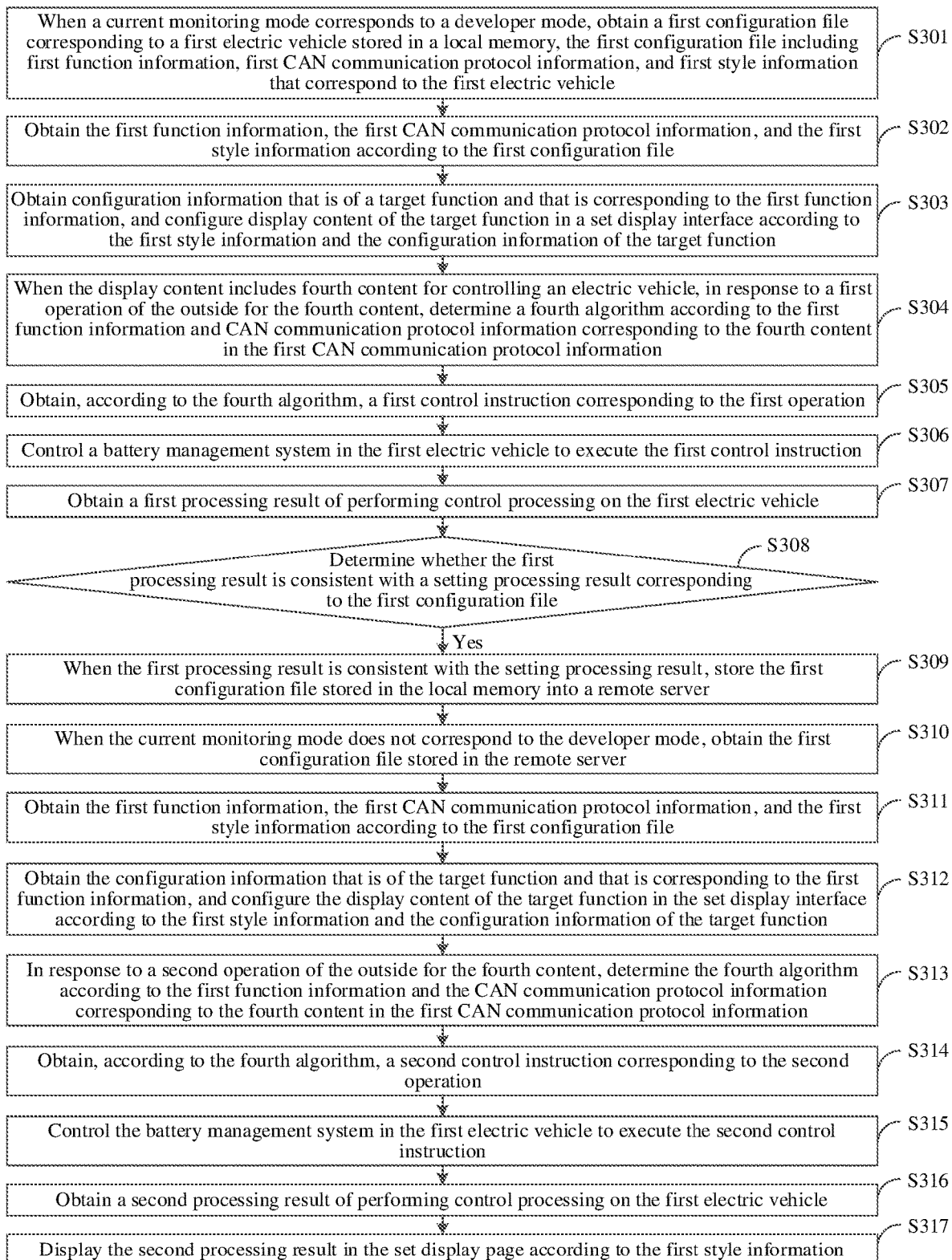
FIG. 3 is a schematic flowchart of an electric vehicle monitoring method according to an embodiment of the present disclosure.

FIG. 3 is a schematic flowchart of an electric vehicle monitoring method according to an embodiment. This embodiment may be performed by the electronic device 1000 shown in FIG. 1.

As shown in FIG. 3, the method in this embodiment may include step S301 to step S317.

Step S301. When a current monitoring mode corresponds to a developer mode, a first configuration file corresponding to a first electric vehicle stored in a local memory is obtained. The first configuration file includes first function information, first CAN communication protocol information, and first style information that correspond to the first electric vehicle.

Step S302. The first function information, the first CAN communication protocol information, and the first style information are obtained according to the first configuration file.

Step S303. Configuration information that is of a target function and that is corresponding to the first function information is obtained. Display content of the target function in a set display interface is configured according to the first style information and the configuration information of the target function.

Step S304. When the display content includes fourth content for controlling an electric vehicle, in response to a first operation of the outside for the fourth content, a fourth algorithm is determined according to the first function information and CAN communication protocol information corresponding to the fourth content in the first CAN communication protocol information.

Step S305. A first control instruction corresponding to the first operation is obtained according to the fourth algorithm.

Step S306. A battery management system in the first electric vehicle is controlled to execute the first control instruction.

Step S307. A first processing result of performing control processing on the first electric vehicle is obtained.

Step S308. Whether the first processing result is consistent with a setting processing result corresponding to the first configuration file is determined.

Step S309. When the first processing result is consistent with the setting processing result, the first configuration file stored in the local memory is stored into a remote server.

Step S310. When the current monitoring mode does not correspond to the developer mode, the first configuration file stored in the remote server is obtained.

Step S311. The first function information, the first CAN communication protocol information, and the first style information are obtained according to the first configuration file.

Step S312. The configuration information that is of the target function and that is corresponding to the first function information is obtained. The display content of the target function in the set display interface is configured according to the first style information and the configuration information of the target function.

Step S313. In response to a second operation of the outside for the fourth content, the fourth algorithm is determined according to the first function information and the CAN communication protocol information corresponding to the fourth content in the first CAN communication protocol information.

Step S314. A second control instruction corresponding to the second operation is obtained according to the fourth algorithm.

Step S315. The battery management system in the first electric vehicle is controlled to execute the second control instruction.

Step S316. A second processing result of performing control processing on the first electric vehicle is obtained.

Step S317. The second processing result is displayed in the set display interface according to the first style information.

Device Embodiments

Figure 4:
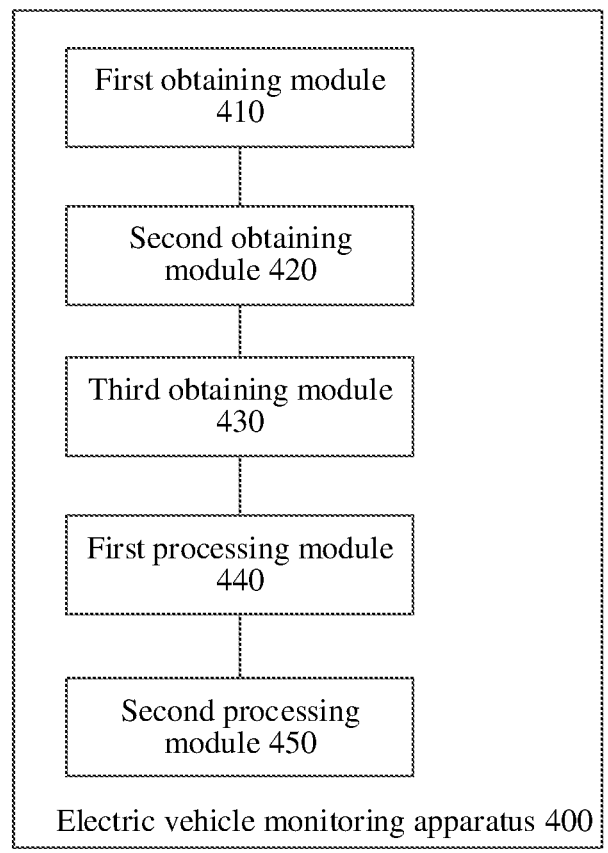
FIG. 4 is a schematic block diagram of an electric vehicle monitoring apparatus according to an embodiment of the present disclosure.

FIG. 4 is a schematic block diagram of an electric vehicle monitoring apparatus 400 according to an embodiment. As shown in FIG. 4, the electric vehicle monitoring apparatus 400 may include a first obtaining module 410, a second obtaining module 420, a third obtaining module 430, a first processing module 440 and a second processing module 450.

The electric vehicle monitoring apparatus 400 may be the electronic device 1000 shown in FIG. 1.

The first obtaining module 410 is configured to obtain a first configuration file corresponding to a first electric vehicle. The first configuration file includes first function information, first CAN communication protocol information, and first style information that correspond to the first electric vehicle. The second obtaining module 420 is configured to obtain the first function information, the first CAN communication protocol information, and the first style information according to the first configuration file. The third obtaining module 430 is configured to obtain configuration information that is of a target function and that is corresponding to the first function information. The first processing module 440 is configured to configure display content of the target function in a set display interface according to the first style information and the configuration information of the target function. The second processing module 450 is configured to perform monitoring processing on the first electric vehicle according to the display content and the first CAN communication protocol information.

It can be learned that a configuration file including function information, CAN communication protocol information, and style information that correspond to an electric vehicle to be monitored is imported, to cope with diversified models and changing monitoring needs. A corresponding functional monitoring interface can be configured in a targeted manner based on the configuration file in this embodiment, so that a user can realize monitoring processing on the electric vehicle to be monitored accordingly. This general reconfigurable monitoring manner is applicable to various electric vehicles and monitoring purposes under various monitoring needs, without repeatedly designing targeted monitoring programs, thereby improving an overall monitoring effect.

In an embodiment of the present disclosure, the second processing module 450 is configured to: when the display content includes first content for looking up electric vehicle information, determine a first algorithm according to the first function information and CAN communication protocol information corresponding to the first content in the first CAN communication protocol information; process, according to the first algorithm, information reported by the first electric vehicle through a CAN network bus, to obtain a first processing result; and display the first processing result in the set display interface according to the first content.

In an embodiment of the present disclosure, the second processing module 450 is configured to: when the display content includes second content for achieving calibration, in response to first input information of the outside for the second content, determine a second algorithm according to the first function information and CAN communication protocol information corresponding to the second content in the first CAN communication protocol information; obtain a calibration instruction corresponding to the first input information according to the second algorithm; and control a battery management system in the first electric vehicle to execute the calibration instruction, to write the first input information into the battery management system.

In an embodiment of the present disclosure, the second processing module 450 is configured to: when the display content includes third content for achieving simulation, in response to second input information of the outside for the third content, determine a third algorithm according to the first function information and CAN communication protocol information corresponding to the third content in the first CAN communication protocol information; and send the second input information to the battery management system in the first electric vehicle through the CAN network bus according to the third algorithm by using a role of a setting module. The setting module includes any one of a microcontroller unit, a vehicle control unit, an electronic control unit, a baseboard management controller, and a total distribution system of the first electric vehicle.

In an embodiment of the present disclosure, the second processing module 450 is configured to: when the display content includes fourth content for controlling an electric vehicle, in response to a first operation of the outside for the fourth content, determine a fourth algorithm according to the first function information and CAN communication protocol information corresponding to the fourth content in the first CAN communication protocol information; obtain a control instruction corresponding to the first operation according to the fourth algorithm; and control the battery management system in the first electric vehicle to execute the control instruction.

In an embodiment of the present disclosure, the fourth content includes at least one first control, at least one second control, and an information input box corresponding to each first control. The second processing module 450 is configured to: when the first operation includes an operation of inputting control information in any information input box, obtain the inputted control information and configuration content corresponding to the first control in the configuration information; when the first operation includes an operation of triggering any second control, obtain configuration content corresponding to the second control in the configuration information; and perform the step of obtaining a control instruction corresponding to the first operation according to the obtained control information and the obtained configuration content.

In an embodiment of the present disclosure, the second processing module 450 is configured to: obtain a second processing result of performing control processing on the battery management system in the first electric vehicle; and display the second processing result in the set display interface according to the first style information.

In an embodiment of the present disclosure, the first obtaining module 410 is configured to: when a current monitoring mode corresponds to a developer mode, obtain the first configuration file stored in a local memory; and when the current monitoring mode does not correspond to the developer mode, obtain the first configuration file stored in a remote server.

In an embodiment of the present disclosure, the second processing module 450 is configured to: when the current monitoring mode corresponds to the developer mode, perform monitoring processing on the first electric vehicle. The electric vehicle monitoring apparatus 400 further includes: a module configured to obtain a third processing result of performing monitoring processing on the first electric vehicle; a module configured to determine whether the third processing result is consistent with a setting processing result corresponding to the first configuration file; and a module configured to: when the third processing result is consistent with the setting processing result, store the first configuration file stored in the local memory into the remote server.

Figure 5:
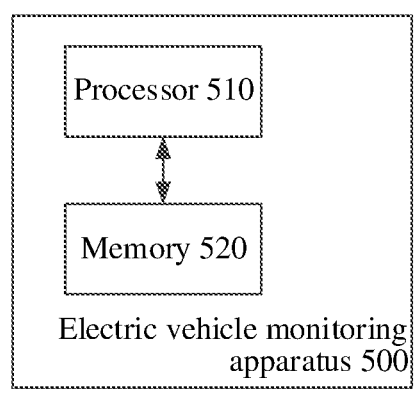
FIG. 5 is a schematic diagram of a hardware structure of an electric vehicle monitoring apparatus according to an embodiment of the present disclosure.

FIG. 5 is a schematic diagram of a hardware structure of an electric vehicle monitoring apparatus 500 according to an embodiment.

As shown in FIG. 5, the electric vehicle monitoring apparatus 500 includes a processor 510 and a memory 520. The memory 520 is configured to store an executable computer program. The processor 510 is configured to perform the method in any method embodiment according to control of the computer program.

The electric vehicle monitoring apparatus 500 may be the electronic device 1000 shown in FIG. 1.

The modules of the electric vehicle monitoring apparatus 500 may be implemented by the processor 510 executing the computer program stored in the memory 520 in this embodiment, or by other circuit structures. This is not limited herein.

The present disclosure may be implemented as a system, a method, and/or a computer program product. The computer program product may include a computer-readable storage medium, storing computer-readable program instructions for enabling a processor to implement the aspects of the present disclosure.

The computer-readable storage medium may be a physical device that can maintain and store instructions used by an instruction-executing device. The computer-readable storage medium may be, for example, but is not limited to, an electric storage device, a magnetic storage device, an optical storage device, an electromagnetic storage device, a semiconductor storage device, or any proper combination of the above. More specific examples (non-exhaustive list) of the computer-readable storage medium include: a portable computer disk, a hard disk, a RAM, a ROM, an erasable programmable read-only memory (EPROM or flash memory), a static random access memory (SRAM), a portable compact disk read-only memory (CD-ROM), a digital versatile disc (DVD), a memory stick, a floppy disk, a mechanical coding device, such as a punch card or a raised structure in a groove on which instructions are stored, and any proper combination of the above. The computer-readable storage medium used herein is not interpreted as an instantaneous signal, such as radio waves or other free-propagating electromagnetic waves, electromagnetic waves propagating through waveguides or other transmission media (for example, optical pulses passing through optical fiber cables), or electrical signals transmitted over electric wires.

The computer-readable program instructions described herein can be downloaded from the computer-readable storage medium to various computing/processing devices, or download to an external computer or external storage device over a network, such as the Internet, a local area network, a wide area network, and/or a wireless network. The network may include a copper transmission cable, optical fiber transmission, wireless transmission, a router, a firewall, a switch, a gateway computer, and/or an edge server. A network adapter card or network interface in each computing/processing device receives a computer-readable program instruction from the network and forwards the computer-readable program instruction for storage in a computer-readable storage medium in each computing/processing device.

The computer program instructions used to perform the operations of the present disclosure may be assembly instructions, instruction set architecture (ISA) instructions, machine instructions, machine-related instructions, microcode, firmware instructions, state-setting data, or source code or object code written in any combination of one or more programming languages. The programming languages include object-oriented programming languages such as Smalltalk and C++, and conventional procedural programming languages such as the "C" language or a similar programming language. The computer-readable program instructions may be completely executed on a user computer, partially executed on a user computer, executed as an independent software package, partially executed on a user computer and partially executed on a remote computer, or completely executed on a remote computer or server. For the case involving a remote computer, the remote computer may be connected to a user computer through any type of network including a local area network (LAN) or a wide area network (WAN), or may be connected to an external computer (for example, through the Internet by using an Internet service provider). In some embodiments, an electronic circuit is personalized by using state information of computer-readable program instructions, such as a programmable logic circuit, a field programmable gate array (FPGA), or a programmable logic array (PLA). The electronic circuit may execute the computer-readable program instructions, to implement the aspects of the present disclosure.

The aspects of the present disclosure are described herein with reference to the flowcharts and/or block diagrams of the method, apparatus (system), and computer program product according to the embodiments of the present disclosure. It is to be understood that each block of the flowcharts and/or block diagrams and combinations of blocks in the flowcharts and/or block diagrams can be implemented by computer-readable program instructions.

These computer-readable program instructions can be provided to a processor of a general-purpose computer, special-purpose computer, or another programmable data processing apparatus, to generate a machine, such that the instructions which executed by the processor of the computer or the another programmable data processing apparatus generate an apparatus for implementing the functions/acts specified in one or more blocks of the flowcharts and/or block diagrams. These computer-readable program instructions may also be stored in a computer-readable storage medium. These instructions enable the computer, programmable data processing apparatus, and/or another device to work in a specified manner. Therefore, the computer-readable medium storing instructions includes a product that includes instructions for implementing the aspects of the functions/acts specified in one or more blocks of the flowcharts and/or block diagrams.

The computer-readable program instructions may also be loaded onto a computer, another programmable data processing apparatus, or another device, to cause a series of operational steps to be performed on the computer, the another programmable data processing apparatus, or the another device, to produce a computer implemented process such that the instructions which are executed on the computer, the another programmable data processing apparatus, or the another device implement the functions/acts specified in one or more blocks of the flowcharts and/or block diagrams.

The flowcharts and block diagrams in the accompanying drawings illustrate the architecture, functionality, and operations of possible implementations of systems, methods and computer program products according to multiple embodiments of the present disclosure. In this regard, each box in a flowchart or a block diagram may represent a module, a program segment, or a part of instructions. The module, the program segment, or the part of instructions includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. It is also to be noted that, each box in a block diagram and/or a flowchart and a combination of boxes in the block diagram and/or the flowchart may be implemented by using a dedicated hardware-based system configured to perform a specified function or act, or may be implemented by using a combination of dedicated hardware and a computer instruction. It is well known to persons skilled in the art that implementation by hardware, implementation by software, and implementation by a combination of software and hardware are equivalent.

The embodiments of the present disclosure have been described above and the foregoing descriptions are illustrative, not exhaustive, and are not limited to the embodiments disclosed. Without departing from the scope and spirit of the described embodiments, many modifications and changes are obvious to persons of ordinary skill in the art. The terms used in this specification are chosen to best explain the principles, actual applications, or technical improvements in the marketplace of embodiments, or to enable other persons of ordinary skill in the art to understand the embodiments disclosed in this specification. The scope of the present disclosure is subject to the appended claims.

What is claimed is:

1. An electric vehicle monitoring method, comprising:
    obtaining a first configuration file corresponding to a first electric vehicle, the first configuration file comprising first function information, first CAN (controller area network) communication protocol information, and first style information;
    obtaining the first function information, the first CAN communication protocol information, and the first style information according to the first configuration file;
    obtaining configuration information that is of a target function and that is corresponding to the first function information;
    configuring display content of the target function in a set display interface according to the first style information and the configuration information of the target function; and
    performing monitoring processing on the first electric vehicle according to the display content and the first CAN communication protocol information,
    wherein the obtaining a first configuration file corresponding to a first electric vehicle comprises:
        when a current monitoring mode corresponds to a developer mode, obtaining the first configuration file stored in a local memory; and
        when the current monitoring mode does not correspond to the developer mode, obtaining the first configuration file stored in a remote server,
    wherein the performing monitoring processing on the first electric vehicle comprises:
        when the current monitoring mode corresponds to the developer mode, performing monitoring processing on the first electric vehicle;
        obtaining a processing result of performing monitoring processing on the first electric vehicle;
        determining whether the processing result of performing monitoring processing on the first electric vehicle is consistent with a setting processing result corresponding to the first configuration file; and
        when the processing result of performing monitoring processing on the first electric vehicle is consistent with the setting processing result, storing the first configuration file stored in the local memory into the remote server.

2. The method according to claim 1, wherein the monitoring processing on the first electric vehicle comprises at least one of surveillance processing, calibration processing, simulation processing, and control processing.

3. The method according to claim 1, wherein when the display content comprises first content for looking up electric vehicle information, the performing monitoring processing on the first electric vehicle according to the display content and the first CAN communication protocol information comprises:
    determining a first algorithm according to the first function information and CAN communication protocol information corresponding to the first content in the first CAN communication protocol information;
    processing, according to the first algorithm, information reported by the first electric vehicle through a CAN network bus, to obtain a first processing result; and
    displaying the first processing result in the set display interface according to the first content.

4. The method according to claim 3, wherein the first algorithm corresponds to the monitoring processing.

5. The method according to claim 1, wherein when the display content comprises second content for achieving calibration, the performing monitoring processing on the first electric vehicle according to the display content and the first CAN communication protocol information comprises:
    in response to first input information of the outside for the second content, determining a second algorithm according to the first function information and CAN communication protocol information corresponding to the second content in the first CAN communication protocol information;
    obtaining a calibration instruction corresponding to the first input information according to the second algorithm; and
    controlling a battery management system in the first electric vehicle to execute the calibration instruction, to write the first input information into the battery management system.

6. The method according to claim 5, wherein the second algorithm corresponds to the calibration processing.

7. The method according to claim 1, wherein when the display content comprises third content for achieving simulation, the performing monitoring processing on the first electric vehicle according to the display content and the first CAN communication protocol information comprises:
    in response to second input information of the outside for the third content, determining a third algorithm according to the first function information and CAN communication protocol information corresponding to the third content in the first CAN communication protocol information; and sending the second input information to the battery management system in the first electric vehicle through the CAN network bus according to the third algorithm by using a role of a setting module, wherein the setting module comprises any one of a microcontroller unit, a vehicle control unit, an electronic control unit, a baseboard management controller, and a total distribution system of the first electric vehicle.

8. The method according to claim 7, wherein the third algorithm corresponds to the simulation processing.

9. The method according to claim 1, wherein when the display content comprises fourth content for controlling an electric vehicle, the performing monitoring processing on the first electric vehicle according to the display content and the first CAN communication protocol information comprises:

in response to a first operation of the outside for the fourth content, determining a fourth algorithm according to the first function information and CAN communication protocol information corresponding to the fourth content in the first CAN communication protocol information;

obtaining a control instruction corresponding to the first operation according to the fourth algorithm; and controlling the battery management system in the first electric vehicle to execute the control instruction.

10. The method according to claim 9, wherein the fourth algorithm corresponds to the control processing.

11. The method according to claim 9, wherein the fourth content comprises at least one first control, at least one second control, and an information input box corresponding to each first control.

12. The method according to claim 9, before the obtaining a control instruction corresponding to the first operation, the method further comprising:

when the first operation comprises an operation of inputting control information in any information input box, obtaining the inputted control information and configuration content corresponding to the first control in the configuration information;

when the first operation comprises an operation of triggering any second control, obtaining configuration content corresponding to the second control in the configuration information; and performing, according to the obtained control information and the obtained configuration content, the step of obtaining a control instruction corresponding to the first operation.

13. The method according to claim 9, after the controlling the battery management system in the first electric vehicle to execute the control instruction, the method further comprising:

obtaining a second processing result of performing control processing on the battery management system in the first electric vehicle; and displaying the second processing result in the set display interface according to the first style information.

14. The method according to claim 1, before the obtaining the first configuration file stored in a local memory, the method further comprising:

when the current monitoring mode corresponds to the developer mode, obtaining the first configuration file in response to an operation for editing a configuration file; and storing the first configuration file into the local memory.

15. An electric vehicle monitoring apparatus comprising a processor and a memory, the memory being configured to store a computer program, and the processor being configured to execute the computer program to perform:

obtaining a first configuration file corresponding to a first electric vehicle, the first configuration file comprising first function information, first CAN (controller area network) communication protocol information, and first style information;

obtaining the first function information, the first CAN communication protocol information, and the first style information according to the first configuration file;

obtaining configuration information that is of a target function and that is corresponding to the first function information;

configuring display content of the target function in a set display interface according to the first style information and the configuration information of the target function; and performing monitoring processing on the first electric vehicle according to the display content and the first CAN communication protocol information, wherein the obtaining a first configuration file corresponding to a first electric vehicle comprises:

when a current monitoring mode corresponds to a developer mode, obtaining the first configuration file stored in a local memory; and when the current monitoring mode does not correspond to the developer mode, obtaining the first configuration file stored in a remote server, wherein the performing monitoring processing on the first electric vehicle comprises:

when the current monitoring mode corresponds to the developer mode, performing monitoring processing on the first electric vehicle;

obtaining a processing result of performing monitoring processing on the first electric vehicle;

determining whether the processing result of performing monitoring processing on the first electric vehicle is consistent with a setting processing result corresponding to the first configuration file; and when the processing result of performing monitoring processing on the first electric vehicle is consistent with the setting processing result, storing the first configuration file stored in the local memory into the remote server.

16. The electric vehicle monitoring apparatus according to claim 15, wherein the monitoring processing on the first electric vehicle comprises at least one of surveillance processing, calibration processing, simulation processing, and control processing.

17. The electric vehicle monitoring apparatus according to claim 15, wherein when the display content comprises first content for looking up electric vehicle information, the performing monitoring processing on the first electric vehicle according to the display content and the first CAN communication protocol information comprises:

determining a first algorithm according to the first function information and CAN communication protocol information corresponding to the first content in the first CAN communication protocol information;

processing, according to the first algorithm, information reported by the first electric vehicle through a CAN network bus, to obtain a first processing result; and displaying the first processing result in the set display interface according to the first content.

18. A non-transitory computer-readable storage medium, storing a computer program which, when executed by a processor, performs an electric vehicle monitoring method, comprising:

obtaining a first configuration file corresponding to a first electric vehicle, the first configuration file comprising first function information, first CAN (controller area network) communication protocol information, and first style information;

obtaining the first function information, the first CAN communication protocol information, and the first style information according to the first configuration file;

obtaining configuration information that is of a target function and that is corresponding to the first function information;

configuring display content of the target function in a set display interface according to the first style information and the configuration information of the target function; and performing monitoring processing on the first electric vehicle according to the display content and the first CAN communication protocol information, wherein the obtaining a first configuration file corresponding to a first electric vehicle comprises:

when a current monitoring mode corresponds to a developer mode, obtaining the first configuration file stored in a local memory; and when the current monitoring mode does not correspond to the developer mode, obtaining the first configuration file stored in a remote server, wherein the performing monitoring processing on the first electric vehicle comprises:

when the current monitoring mode corresponds to the developer mode, performing monitoring processing on the first electric vehicle;

obtaining a processing result of performing monitoring processing on the first electric vehicle;

determining whether the processing result of performing monitoring processing on the first electric vehicle is consistent with a setting processing result corresponding to the first configuration file; and when the processing result of performing monitoring processing on the first electric vehicle is consistent with the setting processing result, storing the first configuration file stored in the local memory into the remote server.

* * * * *